(12) United States Patent
Kuroda et al.

(10) Patent No.: US 8,262,015 B2
(45) Date of Patent: Sep. 11, 2012

(54) LAUNCHING SYSTEM AND LAUNCHING APPARATUS

(75) Inventors: Yoshikatsu Kuroda, Tokyo (JP);
Yoshihiro Kawamata, Tokyo (JP);
Mika Shingo, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 339 days.

(21) Appl. No.: 12/649,808

(22) Filed: Dec. 30, 2009

(65) Prior Publication Data
US 2011/0024548 A1   Feb. 3, 2011

(30) Foreign Application Priority Data
Jul. 31, 2009   (JP) ................. 2009-178507

(51) Int. Cl.
*B64D 3/00* (2006.01)
(52) U.S. Cl. ............... 244/3; 244/1 TD; 244/2
(58) Field of Classification Search ............... 244/1 TD, 244/2, 3, 158.1, 158.2, 159.3, 171.3
See application file for complete search history.

(56) References Cited

U.S. PATENT DOCUMENTS

| | | | | |
|---|---|---|---|---|
| 5,740,985 | A * | 4/1998 | Scott et al. ............... | 244/2 |
| 5,899,410 | A * | 5/1999 | Garrett ............... | 244/45 R |
| 6,913,224 | B2 * | 7/2005 | Johansen ............... | 244/3 |
| 7,252,270 | B2 * | 8/2007 | Mitzmacher ............... | 244/171.3 |

FOREIGN PATENT DOCUMENTS

| | | |
|---|---|---|
| DE | 10147144 C1 | 2/2003 |
| GB | 1114414 A | 5/1968 |
| JP | 05-079798 A | 3/1993 |
| JP | 5-231800 A | 9/1993 |
| RU | 2128133 C1 | 3/1999 |
| RU | 2 250 859 C2 | 2/2004 |
| RU | 2 353 546 C2 | 7/2008 |

OTHER PUBLICATIONS

Russian Office Action dated Dec. 6, 2010, issued in corresponding Russian Patent Application No. 2009149740.

* cited by examiner

*Primary Examiner* — Tien Dinh
*Assistant Examiner* — Nicholas McFall
(74) *Attorney, Agent, or Firm* — Westerman, Hattori, Daniels & Adrian, LLP (57) ABSTRACT

A flying object capable of being launched in air is detachably mounted on a wing body of a launching apparatus. The launching apparatus is towed by an aircraft through a cable so as to be run and taken off. After raising the launching apparatus to a launching height of the flying object by the aircraft, the flying object is released from the wing body in air and then the flying object is ignited and launched in air in a launching system. The system for launching in air can be developed without newly developing a platform as a mother ship so that a research cost can be remarkably reduced. In the case that a small artificial satellite is installed in a flying object, it is possible to develop an artificial satellite smoothly and quickly applicable to security matters and disaster observation.

30 Claims, 11 Drawing Sheets

LAUNCHING SYSTEM AND LAUNCHING APPARATUS

TECHNICAL FIELD

The present invention relates to a launching system for launching a flying object in air and a launching apparatus therefore.

BACKGROUND ART

Figure 10:
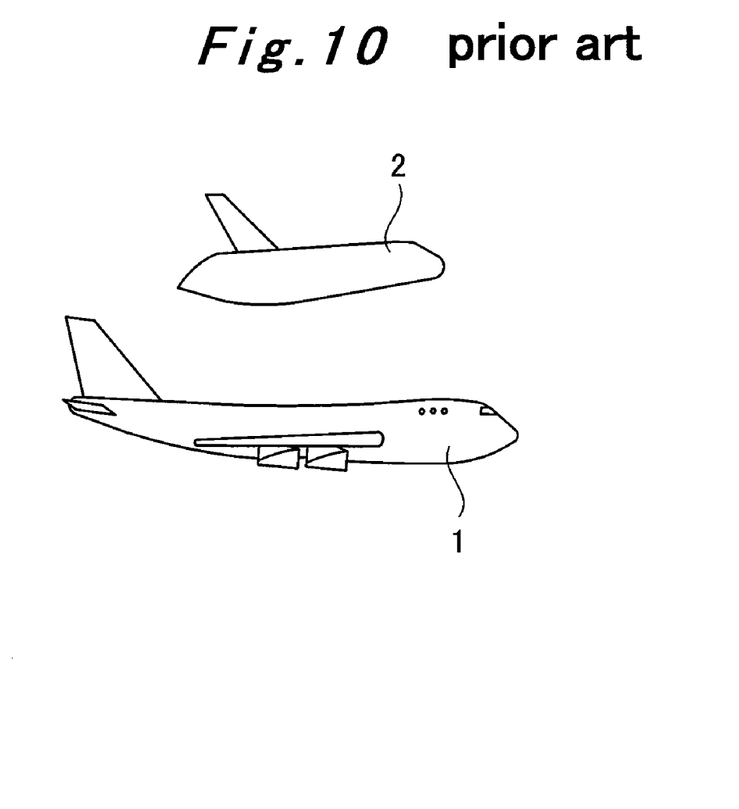
FIG. 10 shows a method for launching a rocket in air wherein the rocket is mounted on an upper surface of an aircraft.
Figure 11:
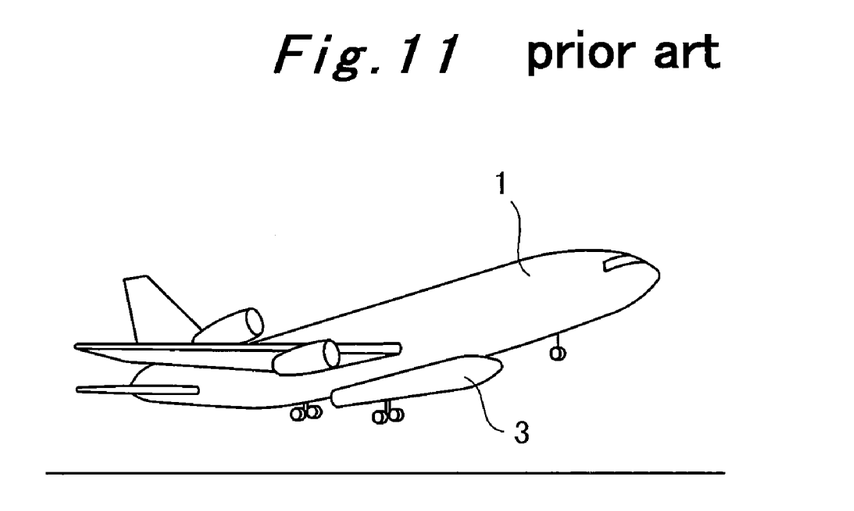
FIG. 11 shows a method for launching a rocket in air wherein the rocket is mounted on a lower surface of an aircraft.
Figure 12:
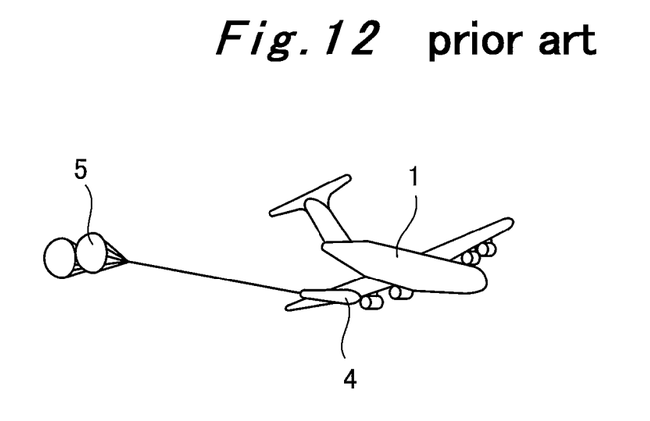
FIG. 12 shows a method for launching a rocket in air wherein the rocket is installed in a cargo space of an aircraft.

As a method for launching a flying object (hereinafter called as "rocket") in air, as shown in FIG. 10, a method for releasing a rocket 2 mounted on an upper surface of an aircraft 1 from the aircraft 1, as shown in FIG. 11, a method for dropping and launching a rocket 3 attached on a lower surface of an aircraft 1 in air or as shown in FIG. 12, a method for pulling out a rocket 4 from a cargo space of an aircraft 1 with utilizing a parachute 5 and then launching the rocket 4 in air have been researched and developed.

As a rocket, a rocket having additional wings 4 detachably mounted at a rear of steering wings 3 is disclosed in a Patent Literature No. 1. Another rocket having a detachable stable wing at a moment when moving power of the rocket is down is disclosed in a Patent Literature No. 2. However, these rockets are not suitable to a method for launching a rocket in air.

CITATION LIST

{Patent Literature No. 1}
Japanese Patent Unexamined Publication No. 5-079798
{Patent Literature No. 2}
Japanese Patent Unexamined Publication No. 5-231800

SUMMARY OF INVENTION

Technical Problem

In order to develop new other methods for launching a rocket in air, it is necessary to develop an aircraft 1 as a mother ship and rockets 2, 3 and 4.

However, the methods described above have a drawback, that is, those techniques could not apply to a development of a satellite type flying object suitable for quickly observing disaster temporally happened.

The present invention is developed so as to resolve the above drawback. A purpose of the present invention is to provide a launching system and a launching apparatus wherein a rocket can be launched in air without designing a special mother ship for the rocket.

Solution to Problem

To accomplish the above purpose in a launching apparatus, a launching apparatus as recited in claim 1 is characterized in that a flying object capable of being launched in air is detachably mounted on a wing body.

To accomplish the above purpose in a launching apparatus as claimed in claim 1, a launching apparatus as recited in claim 2 is characterized in that the wing body comprises wheel member for running.

To accomplish the above purpose in a launching apparatus as claimed in claim 1, a launching apparatus as recited in claim 3 is characterized in that the wing body comprises a main wing and a vertical wing.

To accomplish the above purpose in a launching apparatus as claimed in claim 3, a launching apparatus as recited in claim 4 is characterized in that the main wing is a delta wing for generating elevation force.

To accomplish the above purpose in a launching apparatus as claimed in claim 3, a launching apparatus as recited in claim 5 is characterized in that the main wing is a joined-wing for generating elevation force.

To accomplish the above purpose in a launching apparatus as claimed in claim 1, a launching apparatus as recited in claim 6 is characterized in that the flying object comprises a head portion in which a small artificial satellite is installed.

To accomplish the above purpose in a launching apparatus as claimed in claim 1, a launching apparatus as recited in claim 7 is characterized in that the wing body has suspending means and the flying object is suspended by the suspending means, wherein the suspending means is detachable from the wing body.

To accomplish the above purpose in a launching apparatus as claimed in claim 1, a launching apparatus as recited in claim 8 is characterized in that the flying object is suspended by at least two lanyards of the wing body, wherein the at least two lanyards are detachable from the wing body, one part of the lanyards are cut so as to arrange the head portion of the flying object toward an upward direction and then the remained part of the lanyards are cut so as to release the flying object from the wing body and then the flying object is ignited and launched in air.

To accomplish the above purpose, a launching system recited in claim 9 is characterized in that the launching apparatus as claimed in claim 2 is towed by the aircraft through a cable so as to be run and taken off.

To accomplish the above purpose in a launching system as claimed in claim 9, the launching apparatus recited in claim 10 is characterized in that the launching apparatus is raised up to a launching height of the flying object by the aircraft towing the launching apparatus, and then the flying object is released from the wing body in air and then the flying object is ignited and launched in air.

To accomplish the above purpose in a launching system as claimed in claim 10, the launching system recited in claim 11 is characterized in that the small artificial satellite installed in the head portion is released after being launched the flying object in air.

To accomplish the above purpose in a launching system as claimed in claim 9, the launching system recited in claim 12 is characterized in that the wing body comprises a sensor for locking the aircraft, wherein the sensor is installed in the wing body; and a homing device for automatically controlling a control surface of the wing body so as to maintain the wing body at a proper position with respect to the aircraft in accordance with data obtained by the sensor.

To accomplish the above purpose in a launching system as claimed in claim 9, the launching system recited in claim 13 is characterized in that the wing body installs a sensor for locking the aircraft for towing and the aircraft comprises a homing device for automatically controlling the control surface so as to maintain the wing body at a proper position with respect to the aircraft in accordance with data obtained by the sensor, wherein the wing body is remote controlled by a line control method with the cable or a radio control method.

To accomplish the above purpose in a launching system as claimed in claim 9, the launching system recited in claim 14 is characterized in that the wing body released from the flying object is glided in air and retuned to the nearest airport after cutting the cable connected to the aircraft.

To accomplish the above purpose in a launching system as claimed in claim 9, the launching system as recited in claim 15 is characterized in that a winding device for winding up the cable is provided at one of the aircraft and the launching apparatus wherein an interval distance between the aircraft and the launching apparatus is adjusted by winding up/unwinding from the cable.

To accomplish the above purpose, a launching system as recited in claim 16 is characterized in that the launching apparatus as claimed in claim 1 is mounted on an upper surface or an lower surface of an aircraft and the aircraft is taken off and then the launching apparatus is released from the aircraft after raising up the launching apparatus to a launching height of the flying object by the aircraft and then the flying object is ignited and launched in air after releasing the flying object from the wing body.

To accomplish the above purpose, a launching system recited in claim 17 is characterized in that the launching apparatus as claimed in claim 1 is installed n a cargo space of an aircraft and the aircraft is taken off and then the launching apparatus is pull out from the cargo space of the aircraft after raising up the launching apparatus to a launching height of the flying object by the aircraft and then the flying object is ignited and launched in air after releasing the flying object from the wing body.

Advantageous Effects of Invention

In the launching apparatus as recited in claim 1, a rocket capable of being launched in air is detachably mounted at a wing body so that the rocket is detached from the wing body after raising the launching apparatus to a launching level of the rocket and then the rocked is ignited and launched in air.

In the launching apparatus as recited in claim 2, a wing body comprises wheels do as to run so that the wing body can be glided on a runway while the wing body is towed by the aircraft.

In the launching apparatus as recited in claim 3, a wing body has a main wing and a vertical tail assembly so that the wing body can be glided on a runway and taken off while the wing body is towed by the aircraft. Then, the wing body can be raised up to a launching height of a rocket.

In the launching apparatus as recited in claim 4, a main wing of a wing body is a delta wing for generating elevation force so that the wing body can be easily taken off while the wing body is towed by the aircraft.

In the launching apparatus as recited in claim 5, a main wing of a wing body is a joined-wing for generating elevation force so that the wing body can be easily taken off while the wing body is towed by the aircraft.

In the launching apparatus as recited in claim 6, a small artificial satellite is installed in a head portion of the rocket so that the small artificial satellite is released from the rocket after the rocket reaching to its orbit. Thus, it is possible to develop an artificial satellite smoothly and quickly applicable to security matter and disaster observation.

In the launching apparatus as recited in claim 7, a rocket is suspended from a wing body in air by a suspending member detachable from the wing body so that the rocket can be easily separated from the wing body by cutting the suspending member.

In the launching apparatus as recited in claim 8, a rocket is suspended from the wing body with two lanyards capable of being cut in air. The rocket can easily approach to its orbit for a short time immediately after launching the rocket in air since the head portion of the rocket is already arranged toward an upward direction before igniting the rocket by cutting one lanyard at first and then cutting another lanyard so as to separate the rocket from the wing body.

In the launching system as recited in claim 9, a wing body of a launching apparatus comprises wheels for running and towed by an aircraft so as to be run and taken off. By cutting the cable, the launching apparatus can be easily released from a mother ship after the launching apparatus taking off.

In the launching system as recited in claim 10, a launching apparatus towed by an aircraft is raised up to a launching level of a rocket and then the rocket is separated from a wing body in air. Then, the rocket is ignited and launched in air. Thus, it is unnecessary to develop an aircraft as a mother ship. A research cost and an operation cost can be remarkably reduced.

In the launching system as recited in claim 11, after a rocket launched in air reaching to its orbit, a small artificial satellite installed in a head portion of the rocket is released so that the satellite can be smoothly and quickly applicable to security matter and disaster observation.

In a launching system as recited in claim 12, a wing body installs a sensor for locking an aircraft for towing. The wing body comprises a homing device for automatically controlling a control surface of the wing body so as to maintain a proper position of the wing body with respect to the aircraft in accordance with data obtained by the sensor so that the wing body can be an unmanned aerial vehicle (UAV).

In a launching system as recited in claim 13, a wing body installs a sensor for locking on the aircraft for towing and a homing device for automatically controlling a control surface of the wing body so as to maintain a proper position of the wing body with respect to the aircraft in accordance with data obtained by the sensor. The wing body can be remote-controlled by a line control method with the cable or a radio control method so that a position of the wing body is automatically maintained with respect to an aircraft and the wing body can be an unmanned aerial vehicle. Further, a weight of the wing body becomes light since the wing body does not comprise a homing device therein.

In a launching system as claimed in claim 14, a wing body released from a rocket is separated from an aircraft by cutting a cable and returned to the nearest airport by flying in air so that an operation cost of the launching apparatus can be remarkably reduced.

In a launching system as recited in claim 15, an aircraft of a launching apparatus comprises a winding device for winding up a cable so that an interval distance between the aircraft and the launching apparatus can be adjusted by winging up or unwinding from the winding device. Thus, it is an advantage that a position of a wing body is maintained at a proper position by adjusting the interval distance between the launching apparatus and the aircraft.

In a launching system as recited in claim 16, a rocket capable for being launched in air is detachably attached to a wing body of a launching apparatus and the launching apparatus is mounted on an upper surface or a lower surface of an aircraft. Then, the aircraft is raised up to a launching level of the launching apparatus and then the launching apparatus is separated from the aircraft and the wing body is separated from the rocket. The rocket is ignited and launched in air, a research cost and an operation cost can be remarkably reduced except a cost for developing a suitable aircraft.

In a launching system as recited in claim 17, a rocket capable of being launched in air is detachably attached to a wing body of a launching apparatus and the launching apparatus is installed in a cargo space in an aircraft. The aircraft is raised up to a launching level of the launching apparatus and then the launching apparatus is pulled out from the aircraft and the rocket is separated from the wing body. The rocket is ignited and launched in air. Thus, a research cost and an operation cost of the launching system can be remarkably reduced except a cost developing for a suitable aircraft.

BRIEF DESCRIPTION OF DRAWINGS

FIGS. 9(a), 9(b) and 9(c) show a launching apparatus in a launching system of the second example according to the present invention.

DESCRIPTION OF EMBODIMENTS

Concerning with the best mode to do the present invention, it will be described with reference to the following description.

EXAMPLE 1

A launching system of the first example according to the present invention is shown in FIG. 1 to FIG. 8.

The launching system of the example as shown in FIG. 1 to FIG. 8 comprises a launching apparatus 10 towed by an aircraft 30 through a cable 20 so as to take off the launching apparatus 10 from a runway 100 in a method for towing the launching apparatus 10, wherein a rocket 11 is detached from a wing body 12 of the launching apparatus 10 and the rocket 11 can be launched in air.

For instance, a rocket is enough small and the rocket can install a small artificial satellite in its head portion and the small artificial satellite can be released from the small rocket and put the small artificial satellite on a low-degree orbit, that is, a height of 300 km through 800 km from the earth. It is unnecessary for the rocket 11 to provide anyone except a wing body 12.

Figure 1:
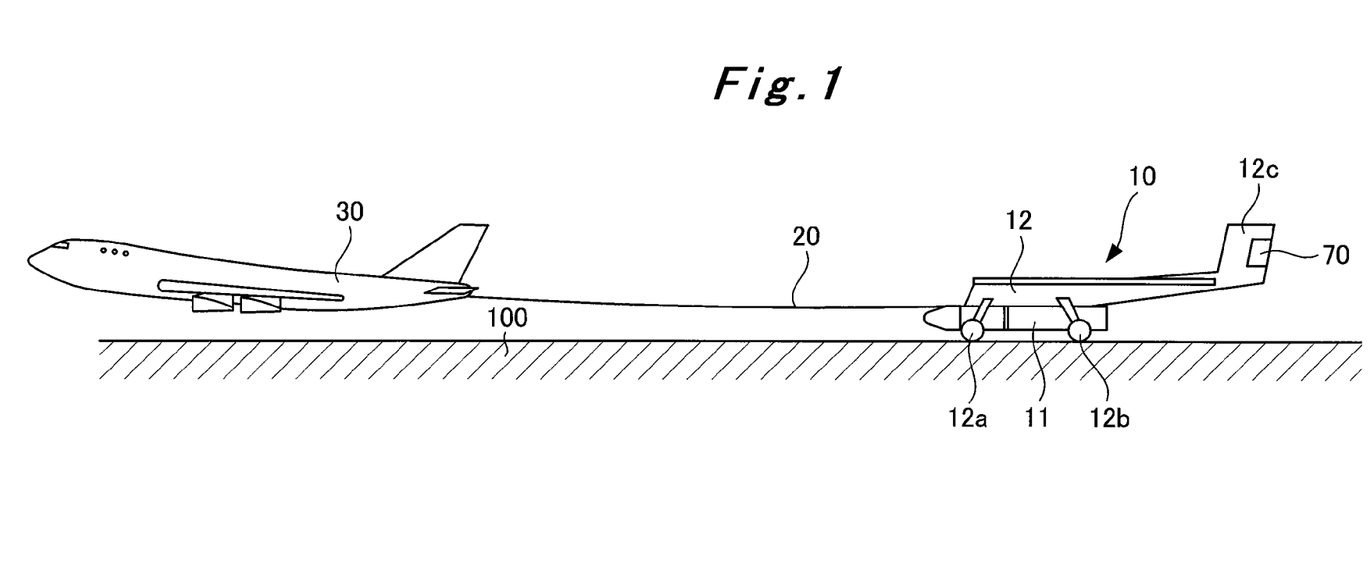
FIG. 1 shows a launching system of the first example according to the present invention wherein a launching apparatus is towed and glided by an aircraft.
Figure 2:
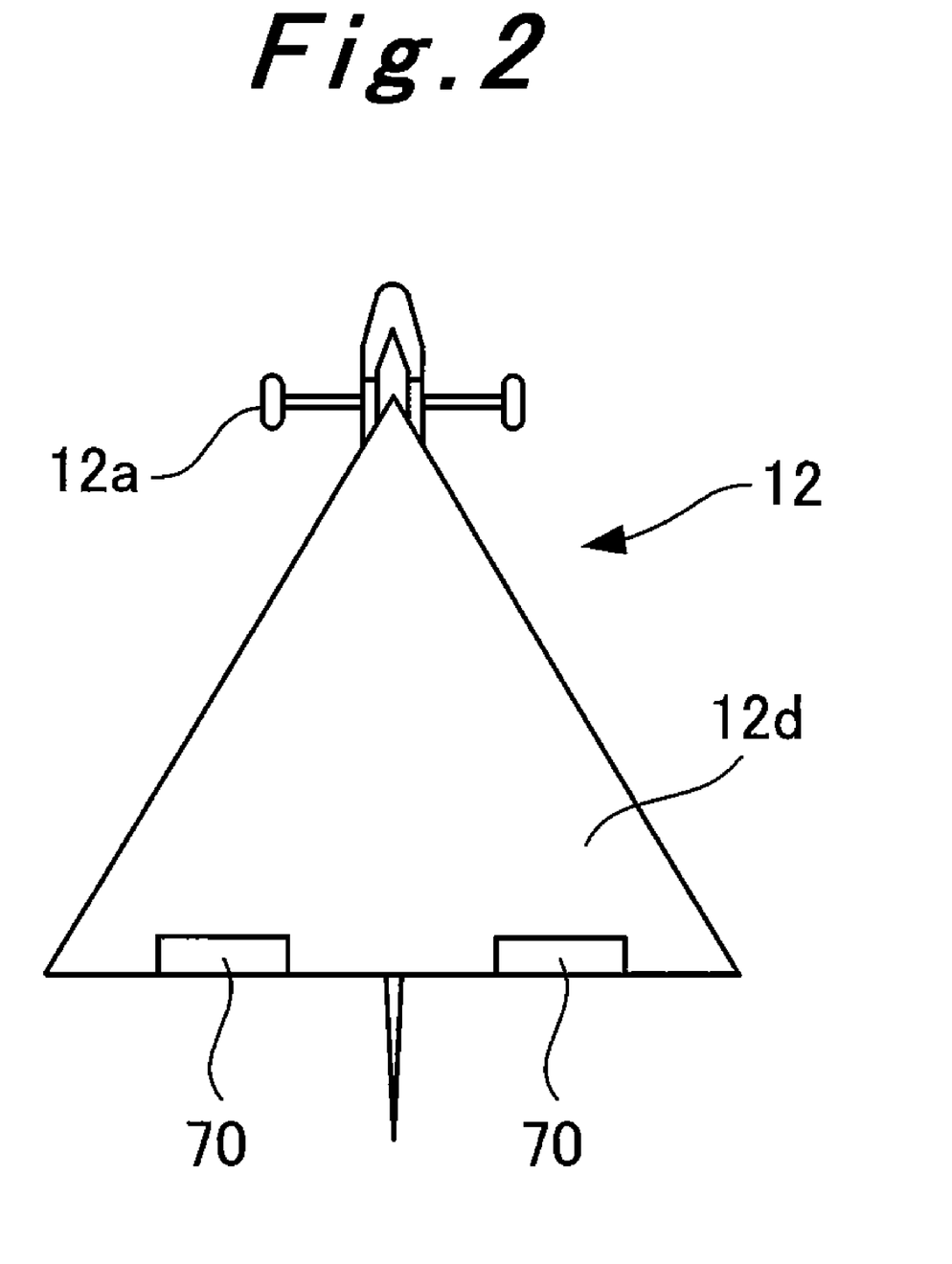
FIG. 2 shows a top view of the launching apparatus in the launching system of the first embodiment according to the present invention.

As shown in FIG. 1 and FIG. 2, the wing body 12 comprises wheel members 12a and 12b wherein the wheel members 12a and 12b is provided at a front portion and a rear portion of the wing body 12, respectively so as to be glided on the runway 100. The wing body 12 comprises a vertical tail assembly 12c at a rear portion of the wing body 12. Further, as shown in FIG. 2, a delta wing 12d is provided as a main wing so as to generate elevation force. The delta wing 12d is a flat-shaped wing. A front edge of the delta wing has a swept-back angle and a rear edge of the delta wing is arranged perpendicular to a longitudinal axis of the aircraft. In a view of a point above the delta wing, the delta wing 12d is looks like a triangle shape. The delta wing 12d generates elevation force and the launching apparatus 10 is towed by the aircraft 30 so that the launching apparatus 10 can be easily taken off.

Although the wing body 12 does not employ any driving device for taking off by itself, the wing body 12 may install an auxiliary driving device so as to assist its flight when the wing body 12 is glided.

Figure 13:
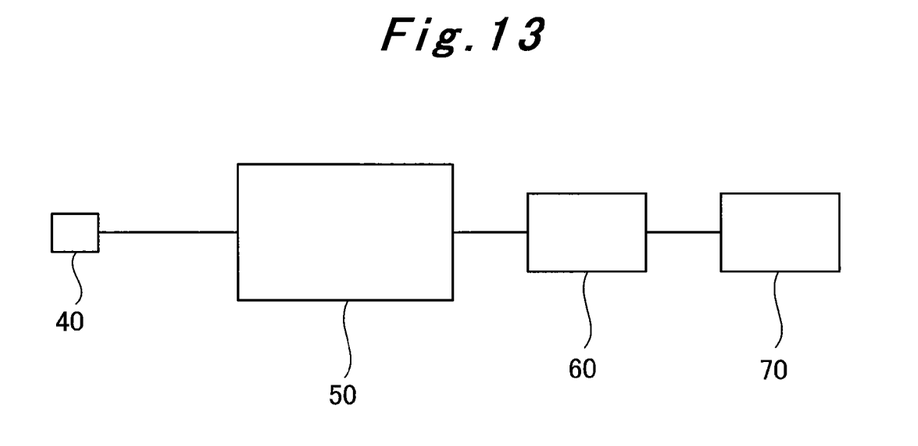
FIG. 13 shows a block diagram of a control system installed in a wing body in the first embodiment according to the present invention.

The wing body 12 is an "Unmanned Aerial Vehicle (UAV)" and comprises a control system as shown in FIG. 13 so as to home the aircraft 30 towed by the wing body 12.

In the wing body 12 as shown in FIG. 13, there are a sensor 40 for homing the aircraft 30 towed by the wing body 12 and a homing device 50 for controlling a control surface of the aircraft 20 so as to maintain a position of the wing body 12 in a constant style with respect to the aircraft 30.

Figure 5:
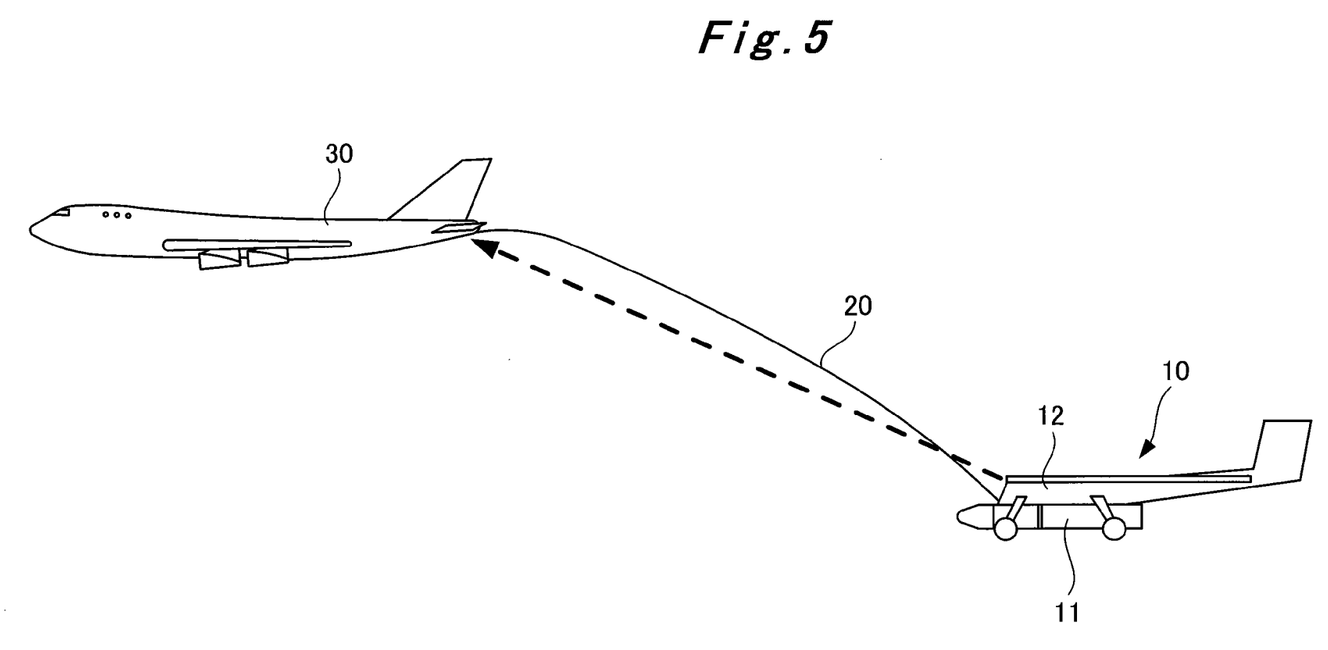
FIG. 5 shows that a launching apparatus in the launching system of the first example according to the present invention homes an aircraft by a sensor.

As shown in a dot-line in FIG. 5, the sensor 40 locks the aircraft 30 while the launching apparatus is towed by the aircraft 30 in air.

The homing device 50 controls the control surface of the wing body 12 by adjusting a part of a wing body (flap) in order to maintain the aircraft 30 locked by the sensor 40 at a constant style with respect to the wind body 12. In practically, as shown in FIG. 13, an actuator 60 controls the flap 70 of the vertical tail wing 12c or the delta wing 12d.

Alternatively, the homing device 50 may not be installed in a wing body and may be installed in an aircraft 30 by utilizing a line control method with a cable or a radio control method so as to control the control surface of the wing body 12 from a remote location. In the above case, a redundant device such as a homing device 50 is unnecessary in the wing body 12 and the position of the wing body 12 can be stably maintained at a constant style with respect to the aircraft 30.

Further, a winding device (not shown) for winding a cable 20 may be provided at an aircraft or a launching apparatus 12. The winding device winds up the cable 20 and unwinding the cable 20 up, so that an interval distance between the aircraft 30 and the launching apparatus 10 can be adjusted. By utilizing the adjustment, the length between the aircraft 30 and the launching apparatus 10 becomes suitable so that a position of the wing body 12 can be set in a preferable style with respect to the aircraft 30.

Although the wing body 12 as shown in FIG. 1 through FIG. 8 is drawn exaggeratedly, that is, the wing body 12 is drawn larger than a real one, the wing body 12 is actually much smaller than the aircraft 30. For instance, a total length of the wing body is about 10 m and a total width thereof is about 8 m.

If an aircraft 30 tows the launching apparatus 10 and then the launching apparatus 10 is taken off, it is unnecessary to develop a special aircraft.

For example, it is possible to utilize a passenger plane, a cargo plane, a transport plane and so on.

By utilizing the launching system of the first example described above, the launching apparatus 10 is towed by the aircraft 30 with the cable 20 and taken off. When the launching apparatus 10 is raised to a launching level, the rocket 11 is released from the wind body 12 and then the rocket 11 can be ignited in air.

Figure 3:
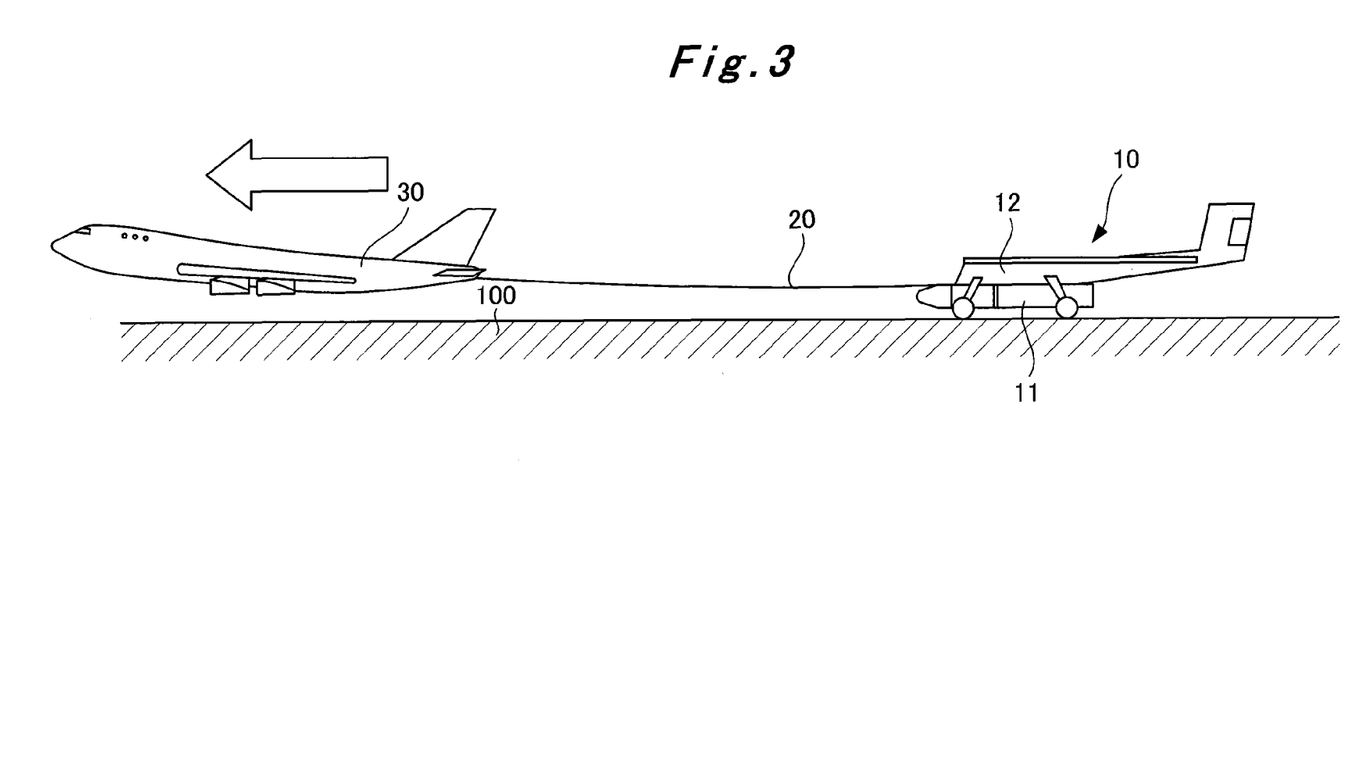
FIG. 3 shows that a launching apparatus in the launching system of the first example according to the present invention, wherein the launching apparatus is towed by an aircraft and glided at a moment immediately before the launching apparatus taking off.
Figure 4:
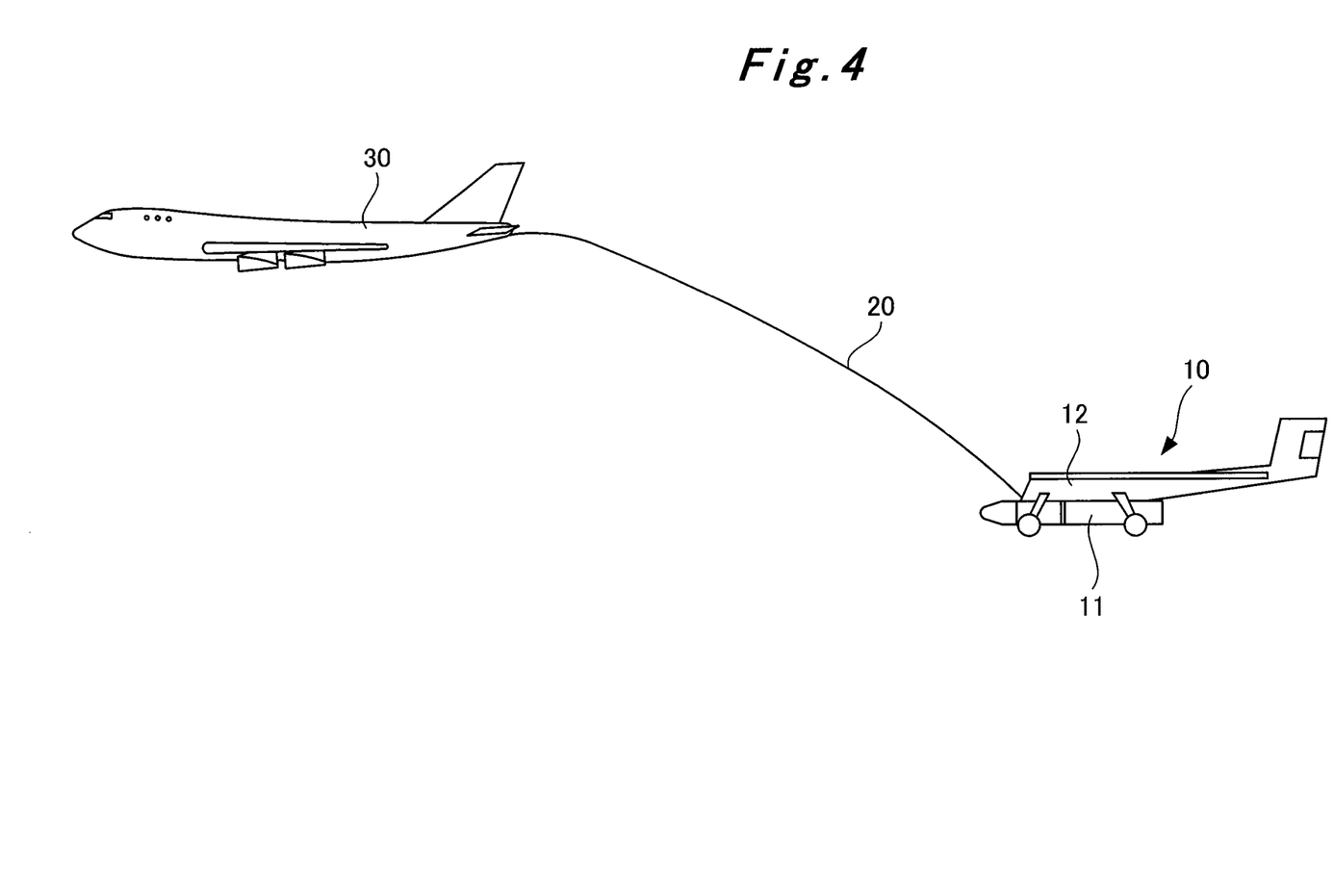
FIG. 4 shows that a launching apparatus in the launching system of the first example according to the present invention is towed by an aircraft in air.

That is, as shown in FIG. 3, the launching apparatus 10 is towed by the aircraft 30 with the cable 20 and run on a runway 100 so as to be taken off. Then, the rocket 11 can be raised to a launching level. As shown a dot-line in FIG. 5, the wing body 12 homes the aircraft 30 for towing the wing body 12 by the sensor 40. In accordance with data obtained by the sensor, the surface control of the wing body 12 can be automatically adjusted with respect to the aircraft.

Figure 6:
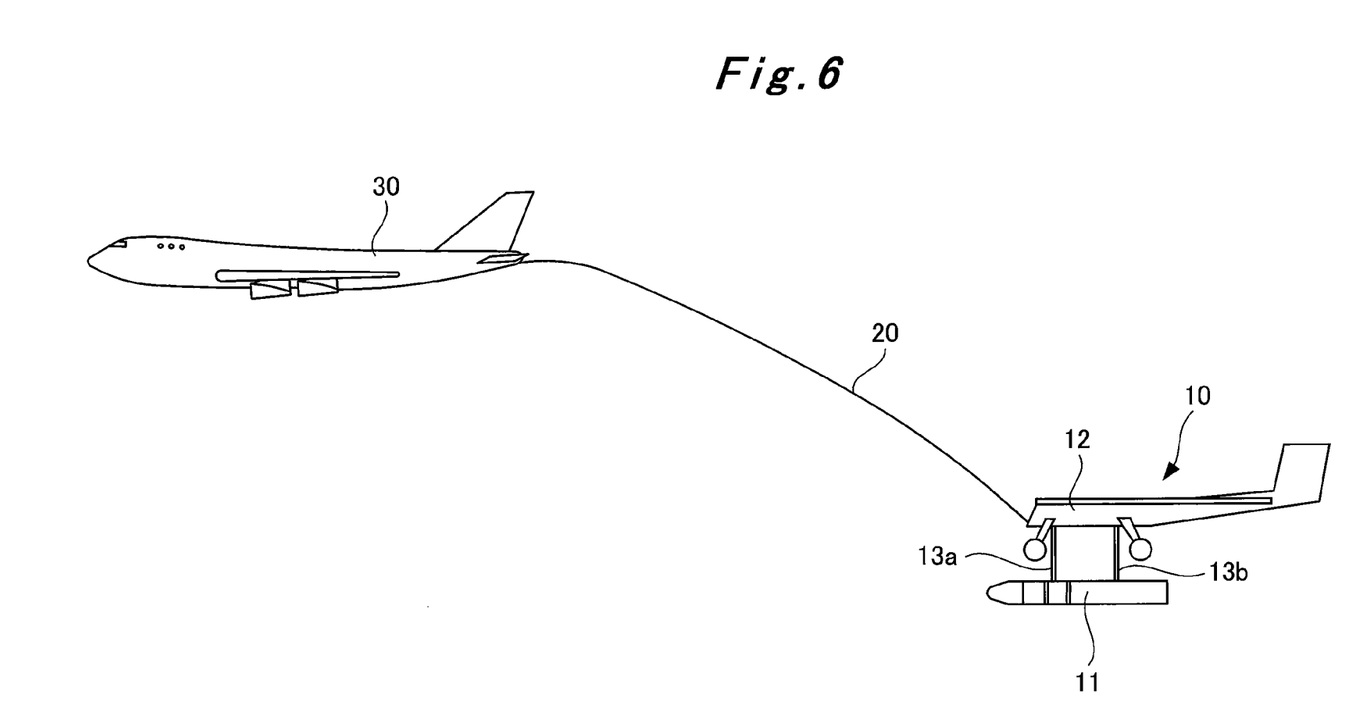
FIG. 6 shows that a launching apparatus in the launching system of the first example according to the present invention suspends a rocket with a lanyard.

As shown in FIG. 6, a rocket 11 is suspended by the wing body 12 with two lanyard 13a and 13b, wherein the lanyards can be cut off and one lanyard 13a is arranged at a front portion and another lanyard 13b is arranged at a rear portion of the wing body 12. The lanyards 13a and 13b are merely one of examples for suspending the rocket 11. It is also possible to utilize a wire, a chain or a suspending rope and so on. A number of lanyards is not restricted two, if the number is plural.

Figure 7:
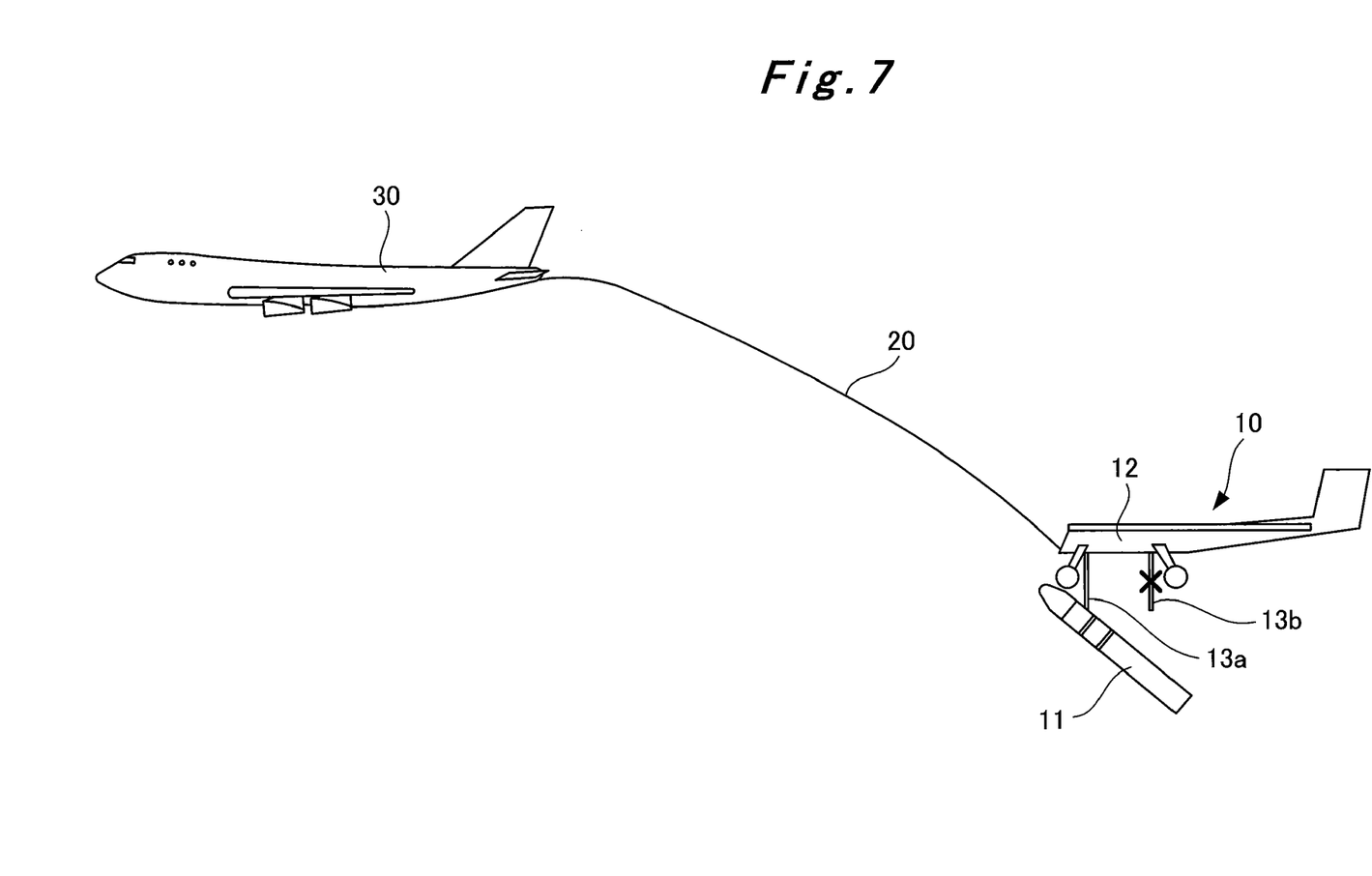
FIG. 7 shows that a launching apparatus in the launching system of the first example according to the present invention has two lanyards and a rocket is just suspended with one of the lanyard so as to arrange a head portion of the rocket positioned toward an upward direction.
Figure 8:
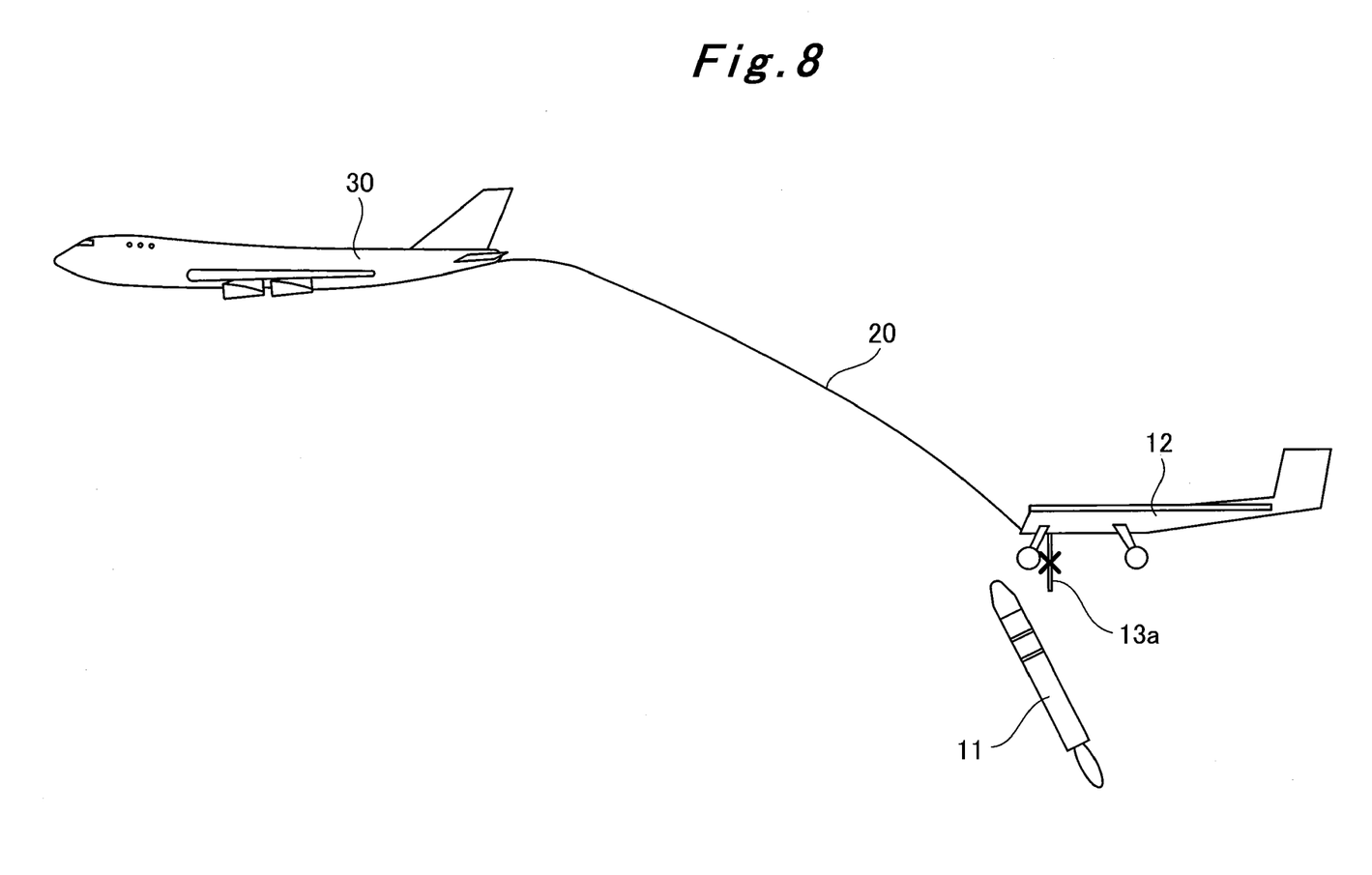
FIG. 8 shows that a launching apparatus in the launching system of the first example according to the present invention cuts one lanyard and a rocket is ignited and launched in air.

As shown in FIG. 7, the rear lanyard 13b is cut off and the rocket is suspended with the front lanyard 13a. A head portion of the rocket 11 is arranged in an upward direction. And then, as shown in FIG. 8, by cutting off the front lanyard 13a, the rocket 11 is separated from the wing body 12 and the rocket 11 is ignited in air so as to be launched toward a front-inclined direction.

In the present example, the rocket 11 is suspended by the two lanyards 13a and 13b. The rocket 11 can be easily separated from the wing body 12 by cutting off the front lanyard 13a and the rear lanyard 13b.

The rocket 11 is launched in air while the head portion of the rocket 11 is arranged toward a upward direction. It is a merit that the rocket 11 can be raised up immediately after launching and the rocket 11 can reach to its orbit for a short time.

In the above example, the rocket 11 is suspended by two lanyards 13a and 13b. However, if a number of lanyards are the plural, any plural number is acceptable. In the case, the head portion of the rocket is arranged toward a front direction. The front lanyard may be cut off after the rear lanyard is cut off at first so as to launch the rocket toward a front inclined direction. Of course, the other arrangement is acceptable.

For instance, in the case that a head portion of a rocket 11 is arranged toward a rear direction, the rear lanyard 13b is cut off after the front lanyard 13a is cut off at first so as to launch the rocket 11 toward rear inclined direction.

In the case, the rocket is launched in air toward a direction opposite to a flying direction of the aircraft 30. Thus, the rocket can be launched more safety.

It is the easiest way that a cable 20 connecting with a wing body 12 from which the rocket 11 has been already separated and the aircraft 30 is cut and the wing body 12 is wasted after launching the rocket in air. However, if the wing body 12 from which the rocket 11 has been already separated is still towed by the aircraft 30 and landed on the nearest airport, an operation cost concerning about a launching apparatus can be remarkably reduced.

If a cable 20 connecting between an aircraft 30 and a wing body 12 is cut and the wing body 12 can glide in air and be navigated so as to land on the nearest airport, an operation cost concerning about a launching apparatus can be remarkably reduced as similar as above.

Further, although the wing body 12 and the aircraft 30 are connected with the cable 20 as shown in FIG. 8 at a moment when the rocket 11 is ignited in air, the other cases are acceptable in the present invention. For instance, before the rocket 11 ignited and launched in air, the cable connected between the wing body 12 and the aircraft 20 may be cut and the aircraft 30 is escaped to a safety air zone, the launching operation becomes more safety.

As descried above, in accordance with the launching system of the present example, the launching apparatus 10 is towed and taken off by the aircraft 30 with a cable. The launching apparatus 10 is raised to a launch level and then the rocket 11 is ignited and launched in air by releasing the rocket 11 from the wing body 12. Thus, the wing body 12 of the present example is unnecessary a special mother ship. Thereby, a launching system for launching a rocket in air can be developed with a remarkably low cost. On the other hand, it is unnecessary to develop an aircraft 30 as a mother ship so that a development cost and an operation cost can be remarkably reduced.

Particularly, if a rocket 11 installs a small artificial satellite at a head portion, the small artificial satellite can be discharged after the rocket 11 is reached on an orbit. Thereby, it is possible to develop an artificial satellite smoothly and quickly applicable to security matters and disaster observation.

EXAMPLE 2

Figure 9A:
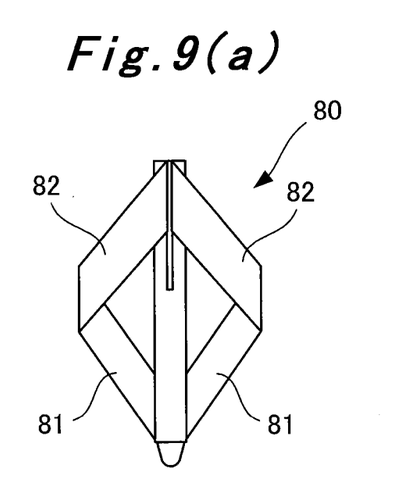
FIG. 9(a) shows its top view.
Figure 9B:
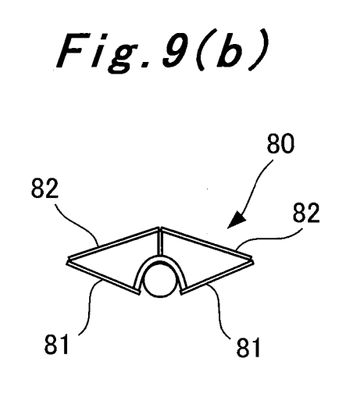
FIG. 9(b) shows its front view.
Figure 9C:
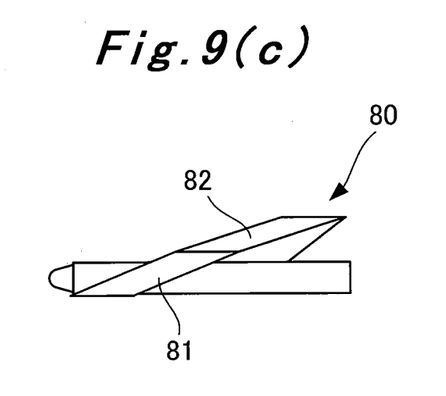
FIG. 9(c) shows it side view.

FIG. 9 shows the second example according to the present invention. The second example utilizes a joined-wing 80 for generating elevation force instead of a delta wing 12d as a main wing of the wing body 12 of the first example.

As shown in FIG. 9, the joined-wing 80 has a structure that a vertical tail assembly with a sweptforward angle is joined to a main wing 81 with a sweptback angle. The joined-wing 80 can generate elevation force equal or larger than that generated by the delta wing 12d of the first example.

In the second example, a rocket 11 can be separated from a wing body 12 with the joined-wing 80 as a main wing so that the effect and the advantage of the second example are as same as those of the first example.

EXAMPLE 3

The examples 1 and 2 as described above employ a tow method for towing a launching apparatus 10 by an aircraft 30. The third example does not employ the tow method and employs an improve method by improving a conventional air launching method as described in the Background Art. The third example can be largely divided into two methods.

A method is as follows:
(1) A launching apparatus is taken off with an aircraft wherein the launching apparatus is mounted on an upper surface or a lower surface of the aircraft. As described in the first example, a rocket capable for launching in air is detachably attached to a wing body.
(2) The launching system is raised to a launching level by the aircraft.

(3) As similar as the first example, the rocket is separated from the wing body and then the rocked is ignited and launched in air.

The other method is as follows:

(1) An aircraft is taken off wherein a launching apparatus is installed in a cargo space of the aircraft. As described in the first example, a rocket capable for igniting in air is detachably attached to a wing body.

(2) The launching system is raised to a launching level for launching the rocket by the aircraft.

(3) The launching system is pull out from the cargo space of the aircraft.

(4) After that, as similar as the first example as described above, the rocket is released from the wing body and the rocket is ignited and launched in air.

According to the third example, a launching apparatus is not towed by an aircraft. A rocket is mounted on an aircraft or installed in a cargo space of an aircraft and then the aircraft is taken off. Upon comparing with the tow method in the first and second examples and the present method of the third example, there is an advantage that a necessary length of a runway on which the aircraft is taken off is shorter than that of the first and second examples.

Particularly, if an aircraft has been already developed, a present method for launching a rocket in air can be launched with a remarkably low cost.

{Industrial Applicability}

In the present invention, a cost for developing a system for launching a rocket in air can be remarkably reduced. Particularly, a rocket in which a small artificial satellite is installed can be launched systematically with a low cost. It is possible to develop an artificial satellite smoothly and quickly applicable to security matters and disaster observation and so on. Therefore, the present invention can be utilized in various industrial fields.

{Reference Signs List}

10 . . . launching apparatus
11 . . . rocket
12 . . . wing body
12a, 12b . . . wheel
12c . . . tail assembly
12d . . . delta wing
13a, 13b . . . lanyard
20 . . . cable
30 . . . aircraft
40 . . . sensor
50 . . . homing apparatus
60 . . . actuator
70 . . . flap
80 . . . joined-wing

The invention claimed is:

1. A launching apparatus, comprising:
a wing body, and
a flying object capable of being launched in air, detachably mounted on said wing body,
wherein said flying object is suspended from said wing body by at least two lanyards attached at different lengthwise positions of said flying object,
wherein said at least two lanyards are detachable from said wing body,
wherein a first one of said at least two lanyards is cut so as to arrange a head portion of said flying object toward an upward direction,
wherein after the first one of said at least two lanyards is cut, the remaining ones of said at least two lanyards are cut so as to release said flying object from said wing body, and
wherein after the remaining ones of said at least two lanyards are cut, said flying object is ignited and launched in air.

2. The launching apparatus of claim 1, wherein said wing body comprises a main wing and a vertical wing.

3. The launching apparatus of claim 2, wherein said main wing is a delta wing capable of generating elevation force.

4. The launching apparatus of claim 2, wherein the main wing is a joined-wing capable of generating elevation force.

5. The launching apparatus of claim 1, wherein said flying object comprises a head portion in which a small artificial satellite is capable of being installed.

6. The launching apparatus of claim 1,
wherein said launching apparatus is initially mounted on an upper surface or a lower surface of an aircraft,
wherein after said aircraft takes off, said launching apparatus is released from said aircraft at a predetermined launching height, and
wherein after said launching apparatus is released from said aircraft, said flying object is ignited and launched in air.

7. The launching apparatus of claim 1,
wherein said launching apparatus is initially installed in a cargo space of an aircraft,
wherein after said aircraft takes off, said launching apparatus is pulled out of said cargo space of said aircraft at a predetermined launching height, and
wherein after said launching apparatus is pulled out of said cargo space of said aircraft, said flying object is ignited and launched in air.

8. The launching apparatus of claim 1, wherein said wing body includes a wheel member for running on a runway.

9. A launching system, comprising:
an aircraft, and
a launching apparatus, comprising
a wing body, and
a flying object capable of being launched in air, detachably mounted on the wing body,
wherein said launching apparatus is attached to said aircraft
wherein said flying object is suspended from said wing body by at least two lanyards attached at different lengthwise positions of said flying object,
wherein said at least two lanyards are detachable from said wing body,
wherein a first one of said at least two lanyards is cut so as to arrange a head portion of said flying object toward an upward direction,
wherein after the first one of said at least two lanyards is cut, the remaining ones of said at least two lanyards are cut so as to release said flying object from said wing body, and
wherein after the remaining one of said at least two lanyards are cut, said flying object is ignited and launched in air.

10. The launching system of claim 9,
wherein after said launching apparatus is elevated to a predetermined launching height by said aircraft, said flying object is released from said wing body in air,
wherein after said flying object is released from said wing body, said flying object is ignited and launched in air.

11. The launching system of claim 10, wherein an artificial satellite is installed in a head portion of said flying object and released after said flying object is launched in air.

12. The launching system of claim 9,
wherein said launching apparatus is initially mounted on an upper surface or a lower surface of said aircraft, wherein after said aircraft takes off, said launching apparatus is released from said aircraft at a predetermined launching height, and wherein after said launching apparatus is released from said aircraft, said flying object is ignited and launched in air.

13. The launching system of claim 9, wherein said launching apparatus is initially installed in a cargo space of said aircraft, wherein after said aircraft takes off, said launching apparatus is pulled out of said cargo space of said aircraft at a predetermined launching height, and wherein after said launching apparatus is pulled out of said cargo space of said aircraft, said flying object is ignited and launched in air.

14. The launching system of claim 9, wherein said launching apparatus is attached to said aircraft through a cable.

15. The launching system of claim 14, wherein said wing body comprises a sensor for locking onto said aircraft, and a homing device for automatically controlling a control surface of said wing body so as to maintain said wing body at a predetermined position with respect to said aircraft in accordance with data obtained by said sensor.

16. The launching system of claim 14, wherein said wing body comprises a sensor for locking onto said aircraft, wherein said aircraft comprises a homing device for automatically controlling a control surface of said wing body so as to maintain said wing body at a predetermined position with respect to said aircraft in accordance with data obtained by said sensor, and wherein said wing body is remote controlled by line control with the cable or by radio control.

17. The launching system of claim 14, wherein said wing body is released from said flying object so as to glide in air and return to an airport after cutting the cable connected to said aircraft.

18. The launching system of claim 17, wherein one of said aircraft and said launching apparatus includes a winding device for winding up said cable, and wherein an interval distance between said aircraft and said launching apparatus is adjusted by winding or unwinding said cable.

19. The launching system of claim 14, wherein said launching apparatus is towed by said aircraft through the cable.

20. The launching system of claim 9, wherein said wing body includes a wheel member for running on a runway, and wherein said flying object is mounted below said wing body such that said flying object does not impede running of said wheel member on the runway.

21. A method of launching a flying object, comprising:

elevating a launching system, the launching system comprising an aircraft, and a launching apparatus, comprising a wing body and a flying object capable of being launched in air, the flying object being detachably mounted on the wing body, said launching apparatus being attached to said aircraft, detaching said flying object from said launching apparatus, and igniting and launching said flying object, wherein said flying object is suspended from said wing body of said launching apparatus by at least two lanyards detachably mounted at different lengthwise positions of said flying object, wherein said detaching includes first detaching a first one of said at least two lanyards so as to arrange a head portion of said flying object toward an upward direction, and then detaching the remaining ones of said at least two lanyards so as to release said flying object from said wing body.

22. The method of claim 21, wherein after said wing body is released from said flying object, said wing body glides in air and returns to an airport.

23. The method of claim 21, wherein said launching apparatus attached to said aircraft by being initially mounted on an upper surface or a lower surface of an aircraft, wherein after said aircraft takes off, said launching apparatus is released from said aircraft at a predetermined launching height, and wherein after said launching apparatus is released from said aircraft, said flying object is ignited and launched.

24. The method of claim 21, wherein said launching apparatus attached to said aircraft by being initially installed in a cargo space of an aircraft, wherein after said aircraft takes off, said launching apparatus is pulled out of said cargo space of said aircraft at a predetermined launching height, and wherein after said launching apparatus is pulled out of said cargo space of said aircraft, said flying object is ignited and launched.

25. The method of claim 21, wherein said launching apparatus is attached to said aircraft through a cable.

26. The method of claim 25, wherein said wing body comprises a sensor for locking onto said aircraft; and a homing device for automatically controlling a control surface of said wing body so as to maintain said wing body at a predetermined position with respect to said aircraft in accordance with data obtained by said sensor.

27. The method of claim 25, wherein said wing body comprises a sensor for locking onto said aircraft, wherein said aircraft comprises a homing device for automatically controlling a control surface of said wing body so as to maintain said wing body at a predetermined position with respect to said aircraft in accordance with data obtained by said sensor, and wherein said wing body is remote controlled by line control with the cable or by radio control.

28. The method of claim 25, wherein one of said aircraft and said launching apparatus includes a winding device for winding up said cable, and wherein an interval distance between said aircraft and said launching apparatus is adjusted by winding or unwinding said cable.

29. The method of claim 25, wherein said launching apparatus is towed by said aircraft through the cable.

30. The method of claim 21, wherein said wing body includes a wheel member for running on a runway, and wherein said flying object is mounted below said wing body such that said flying object does not impede running of said wheel member on the runway.

* * * * *